US009010397B2

(12) United States Patent
Kirkland

(10) Patent No.: US 9,010,397 B2
(45) Date of Patent: Apr. 21, 2015

(54) HAND OPERATED TOOL FOR APPLICATION OF VINYL GRAPHIC MATERIALS

(71) Applicant: Timothy E. Kirkland, West Palm Beach, FL (US)

(72) Inventor: Timothy E. Kirkland, West Palm Beach, FL (US)

( * ) Notice: Subject to any disclaimer, the term of this patent is extended or adjusted under 35 U.S.C. 154(b) by 0 days.

(21) Appl. No.: 14/213,651

(22) Filed: Mar. 14, 2014

(65) Prior Publication Data

US 2014/0259493 A1 Sep. 18, 2014

Related U.S. Application Data

(60) Provisional application No. 61/782,560, filed on Mar. 14, 2013.

(51) Int. Cl.
*B32B 37/00* (2006.01)
*B44D 3/22* (2006.01)
*B25B 33/00* (2006.01)
*B44C 1/10* (2006.01)

(52) U.S. Cl.
CPC . *B44D 3/22* (2013.01); *B25B 33/00* (2013.01); *B44C 1/105* (2013.01)

(58) Field of Classification Search
USPC ............................ 156/71, 574, 579, 580, 581
See application file for complete search history.

(56) References Cited

U.S. PATENT DOCUMENTS 5,865,945 A * 2/1999 McConaughy ............... 156/579
6,453,970 B1 * 9/2002 Stone et al. ................... 156/579
7,225,848 B2 * 6/2007 Williams ...................... 156/574
8,012,280 B1 * 9/2011 Thorpe ........................... 156/71

* cited by examiner

*Primary Examiner* — James Sells
(74) *Attorney, Agent, or Firm* — McHale & Slavin P.A.

(57) ABSTRACT

The present invention relates to hand tools, and more specifically, to a hand operated application tool for the application of vinyl film materials. The application tool includes a head portion having an elongated relatively thin blade member constructed from a substantially rigid material. A strengthening rib is formed along a top edge of the blade portion allowing the lower portion of the blade member to be formed thinner than would be possible without the rib while still maintaining a substantially rigid tool. A handle member may be attached to the rib portion of the blade member to allow for one handed operation of a blade having an elongated working surface. A layer of padding material is preferably attached along the working surface of the blade member to compensate for slightly uneven surfaces while applying even pressure across the entire working surface of the blade.

18 Claims, 4 Drawing Sheets

HAND OPERATED TOOL FOR APPLICATION OF VINYL GRAPHIC MATERIALS

PRIORITY CLAIM

In accordance with 37 C.F.R. 1.76, a claim of priority is included in an Application Data Sheet filed concurrently herewith. Accordingly, the present invention claims priority to U.S. provisional patent application No. 61/782,560, filed Mar. 14, 2013, entitled "HAND OPERATED TOOL FOR APPLICATION OF VINYL GRAPHIC MATERIALS". The contents of which the above referenced application is incorporated herein by reference.

FIELD OF THE INVENTION

The present invention relates to hand tools, and more specifically, to a hand operated tool for the application of vinyl wrap materials.

BACKGROUND OF THE INVENTION

Wrap advertising is the marketing practice of completely or partially covering (wrapping) a vehicle in an advertisement or livery, thus turning it into a mobile billboard. This can be achieved by simply painting the vehicle surface, but it is becoming more common today to use large vinyl sheets as decals. These can be removed with relative ease, making it much less expensive to change from one advertisement to another. Vehicles with large, flat surfaces, such as buses and light-rail carriages, are fairly easy to work with; smaller cars, structures, sides of buildings and the like with curved surfaces can also be wrapped in this manner, although with greater difficulty. To help with covering large or curved surfaces, a wrap is often divided into a number of smaller pieces. Vinyl wraps are also made to cover side and rear windows on a vehicle, though for obvious safety reasons the front windows used by the driver are not covered. The vinyl used on side windows is typically perforated so that it is still possible to look outside of the vehicle.

In the past, liquid and/or surfactants were utilized in combination with a rubber squeegee to aid in the installation of wraps and decals. However, the liquid also makes installing a graphic article a rather messy process. In addition, if the graphic article is applied to, for example, a plastic substrate to make a sign, the substrate retains moisture after the installation process is complete. This retained moisture requires air drying for an extended period, typically at least one day, before the sign may be rolled up, thermoformed, or otherwise used. The retained moisture may also increase outgassing from some polymeric materials commonly used in backlit signage applications such as, for example, polycarbonates. This outgassing may cause formation of bubbles beneath the graphic article. In addition, vinyl is often heated with a heat gun or torch to mold around objects which may also increase gas formation beneath the vinyl. Bubbles created between the vinyl and the substrate cause the sign to be less attractive to the viewer, and thus less attractive to the purchaser.

Recent advancements in vinyl development have led to new types of vinyls specifically for doing wraps, such as vinyls that feature air channels to reduce the formation of bubbles, and microscopic glass beads that prevent the adhesive from taking hold until a force sufficient to break the glass beads is applied to the surface of the vinyl. This feature allows the material to be lifted and reapplied as needed during the wrapping process, without stretching the vinyl wrap material out of the desired shape.

Even with the recent developments in the technology contained in the vinyl itself, the tools utilized by technicians for installation of the vinyl have remained virtually unchanged. Technicians typically utilize rubber and/or plastic squeegees and razor blades to complete the installations. Therefore, there is a need in the art for a hand operated application blade specifically constructed for use in applying vinyl wrap type materials to various substrates. The application tool should be suitable for use on curved as well as flat surfaces, and should be sufficiently lightweight, yet durable, to allow extended use by a technician.

SUMMARY OF THE INVENTION

The present invention relates to hand tools, and more specifically, to a hand operated application tool for the application of vinyl film materials. The application tool includes a head portion having an elongated, relatively thin blade member constructed from a substantially rigid material. A strengthening rib is formed along a top edge of the blade portion allowing the lower portion of the blade member to be formed thinner than would be possible without the rib while still maintaining a substantially rigid tool. A handle member may be attached to the rib portion of the blade member to allow for one handed operation of a blade having an elongated working surface. A layer of padding material is preferably attached along the working surface of the blade member to compensate for slightly uneven surfaces while applying even pressure across the entire working surface of the blade.

Accordingly, it is an objective of the instant invention to provide a hand operable tool for the application of vinyl graphics films.

It is a further objective of the instant invention to provide an elongated substantially rigid blade member having a padded working edge for the application of vinyl graphics films.

It is yet another objective of the instant invention to provide a hand operable tool for the application of vinyl graphics films that includes a handle member that facilitates one handed operation of an elongated tool.

It is a still further objective of the invention to provide a hand operable tool for the application of vinyl graphics films that may be provided in various lengths.

It is still yet another objective of the present invention to provide a hand operated tool for the application of vinyl graphics films that includes a removable pad member constructed from looped polymeric material.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
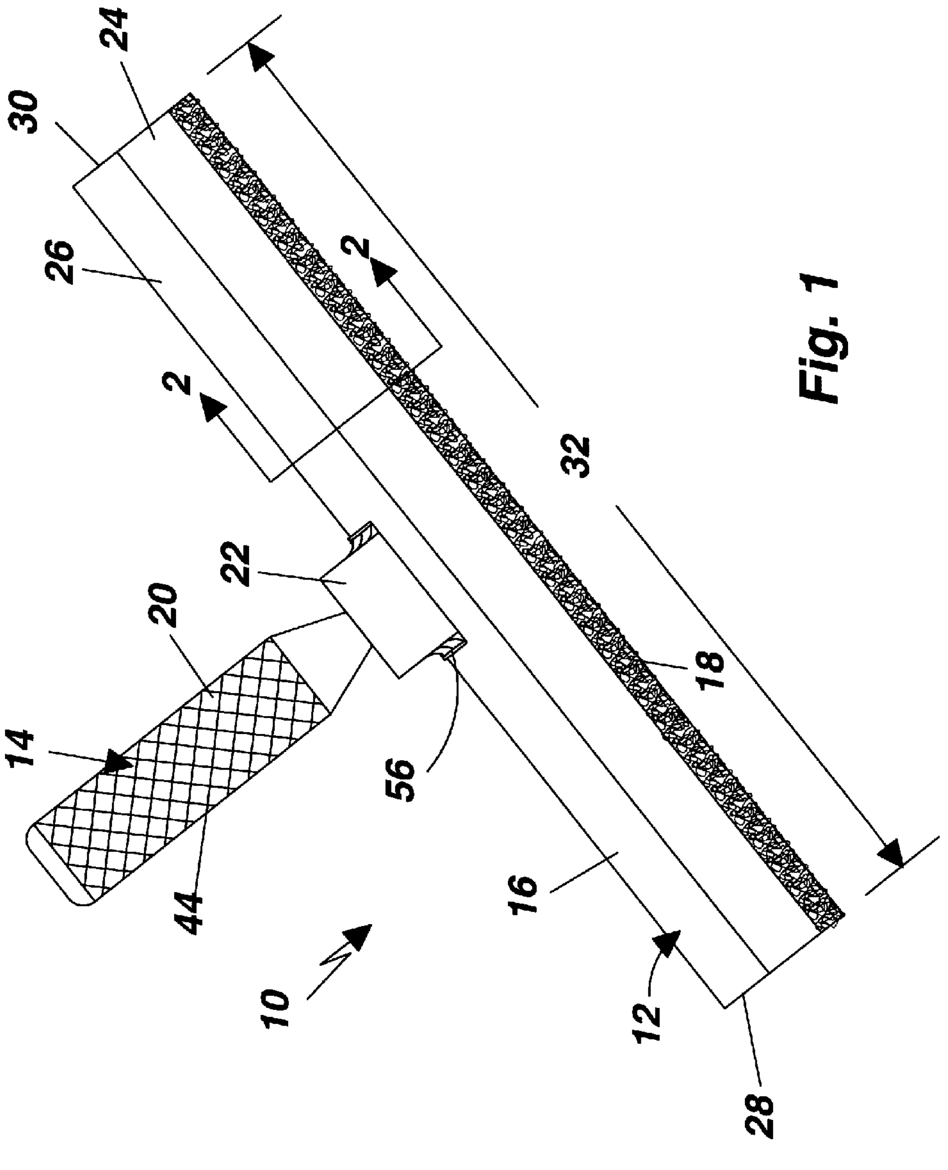
FIG. 1 is a top view of the hand operable tool for the application of vinyl graphics films of the present invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
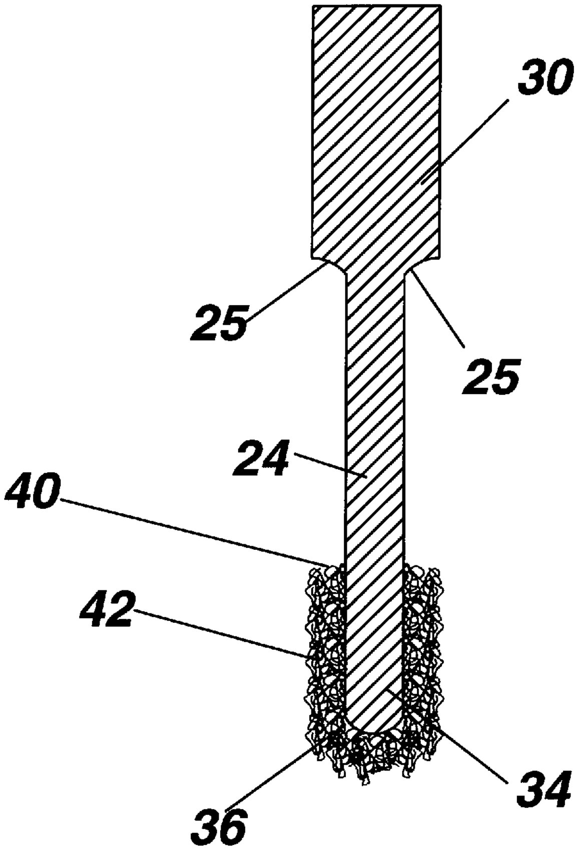
FIG. 2 is a section view taken along lines 2-2 of FIG. 1.
Figure 3:
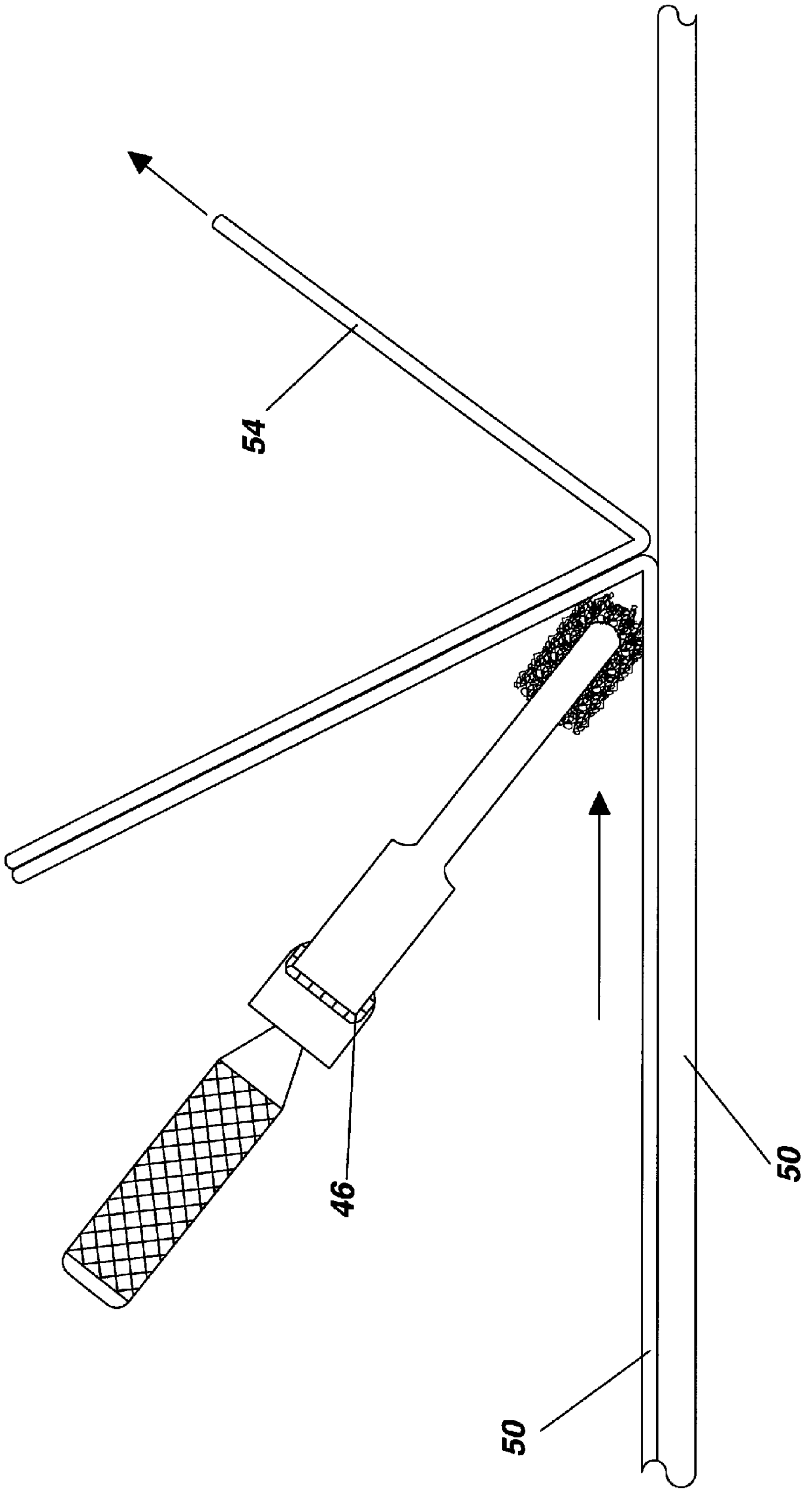
FIG. 3 is a side view illustrating the hand operable tool for the application of vinyl graphics films in the process of applying a vinyl film.
Figure 4:
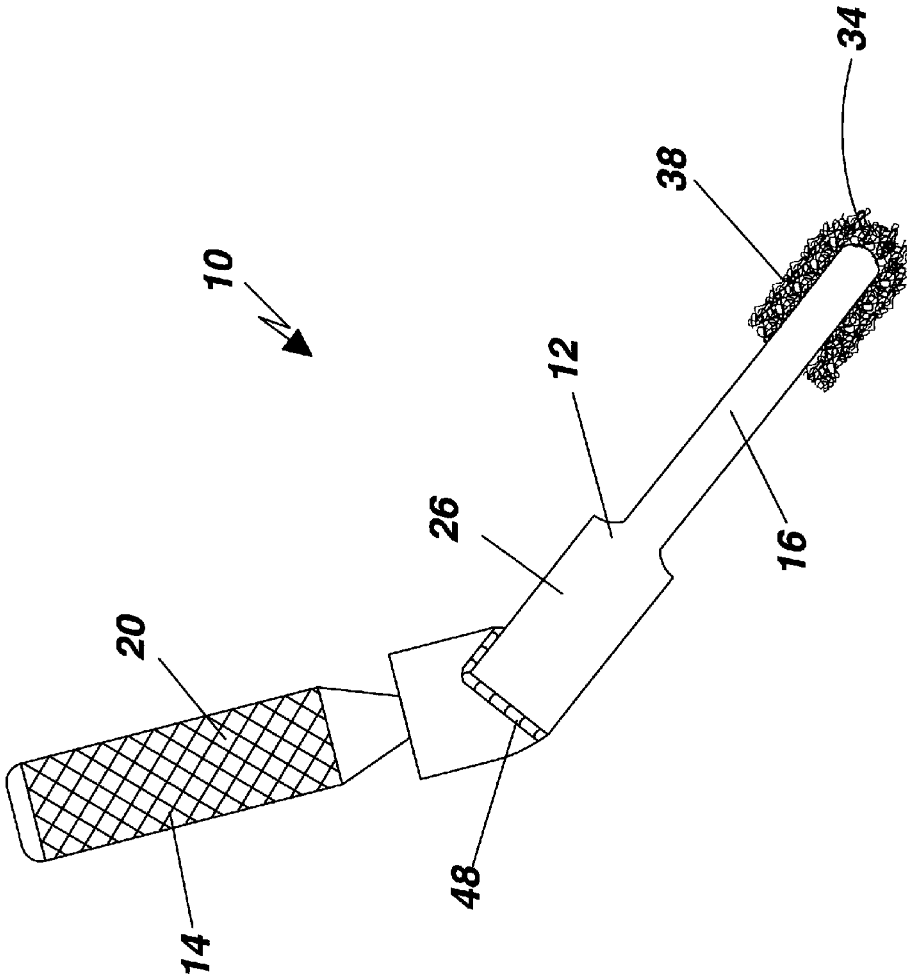
FIG. 4 is a side view illustrating one embodiment of the present invention.

Referring to FIGS. 1-4, a hand operable tool 10 for the application of vinyl graphics films is illustrated. The hand operable tool generally includes a head portion 12 and a handle portion 14. The head portion comprises an elongated member 16 and a pad 18, while the handle portion includes a grip portion 20 and a securing portion 22. The elongated member 16 is preferably constructed from a substantially rigid material to include a blade portion 24 and a strengthening rib portion 26, both of which extend between distal ends 28 and 30 respectively to establish a working length 32. The blade portion is formed to be relatively thin to allow access into narrow spaces while the strengthening rib provides rigidity to the blade. In a most preferred embodiment the blade portion has a thickness of about 3⁄16 of an inch, a width of about 2 inches, and a length of about 12 inches. However, the blade may be formed as thin as about 1⁄16 of an inch and as thick as 3⁄8 of an inch, while the height may range between about ½ inch and 6 inches and the length may vary between about 3 inches and about 48 inches without departing from the scope of the invention. The strengthening rib is preferably formed with a consistent thickness and height across the range of blade thicknesses to minimize manufacturing tooling changes while providing consistency for attachment of the handle portion 14. In a most preferred embodiment, the strengthening rib is formed to be about ½ inch thick and about 1 inch in height. Fillets 25, chamfers or other transitional shapes may be utilized to extend between the strengthening rib and the blade to add rigidity and aesthetic appearance to the assembly. The elongated member is preferably formed as a single unitary element by the process of extrusion and from a material such as, but not limited to, aluminum. However, it should also be noted that the elongated member may be constructed of multiple components that may include a wide range of similar or dissimilar materials having the property of substantial rigidity without departing from the scope of the invention. Such materials may include, but should not be limited to, fiberglass, metals, plastics, hardwoods and suitable combinations thereof. The working edge 34 of the blade portion 24 preferably includes a radius 36 which extends across the width of the blade. A pad 38 is secured to the outer surface of the blade portion to extend around the working edge of the blade. The pad 38 should be constructed from a material that is suitably resilient to allow the blade to cooperate with surfaces having small imperfections and/or curves to provide contact with a substantial length of the working surface. The pad must also be constructed from a material that will not stick to, mar, mark or otherwise affect the surface of the vinyl film material. The pad must also provide sufficient force to the vinyl material to break the microcapsules containing adhesive on the back side of the vinyl material. In a most preferred embodiment, the pad 38 is constructed from the loop portion of a hook and loop fastener assembly. The pad, therefore, preferably includes a backing material 40 having a plurality of polymeric loops 42 secured thereto. The backing material is preferably secured to the blade portion of the elongated member by adhesive or the like which may be removed from time to time for replacement. Alternatively, slots, assemblies, fasteners and the like may be utilized to attach the pad to the blade.

The handle portion 14 is preferably constructed from a single piece of material suitable for attachment to the head portion. The handle portion includes a grip portion 20 and a securing portion 22. The grip portion may be round or any other ergonomic shape suitable for gripping and may additionally include knurling 44, rubber coating or the like to add comfort and/or additional gripping power. The securing portion 22 is generally constructed and arranged to provide strength in connection between the handle and head portions. In one embodiment, the securing portion includes a U-shaped opening 46 (FIG. 3) sized to slip over the strengthening rib for weldment thereto. In another embodiment, the securing portion includes a V-shaped opening 48 that allows the handle to be secured to the strengthening rib at a desired angle. In a most preferred embodiment, the handle portion is constructed from aluminum for attachment to the blade portion; however, the handle portion may be constructed of any material or combination of materials suitable for use as a handle without departing from the scope of the invention. It should also be noted that while weldment is the preferred method of securing the handle portion to the head portion, clamps, fasteners, adhesives and integral formation may be utilized without departing from the scope of the invention.

Still referring to the Figures, operation of the hand operated tool is illustrated. In operation, a relatively smooth substrate material 50 is provided for attachment of the vinyl film 52. A hand operable tool 10 having a width suitable to extend substantially across the width of the vinyl material is selected. The vinyl film is typically provided with a backing material 54 which keeps the adhesive side of the vinyl film free from dirt and debris prior to attachment thereof. The backing material 54 is peeled partially from the vinyl film and a portion of the film is adhered at least temporarily to the substrate. The hand operated tool 10 is then placed against the film on the substrate and moved linearly while the backing material is peeled away to secure the vinyl to the substrate. The attachment may be temporary or permanent depending on the pressure applied to the hand operated tool. If the operator is satisfied with the positioning of the vinyl, additional pressure may be applied to the tool to fracture microcapsules containing adhesive on the back side of the vinyl material, permanently adhering the vinyl to the substrate. The pad 18 includes sufficient stiffness to break the microcapsules without detrimentally affecting the surface finish of the vinyl.

The hand operable tools may be provided in various widths within a kit or they may be available separately. In addition, heads having various lengths may come in a kit with a single handle portion that is removably securable to the head portion of choice for a particular application.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A hand operable tool for the application of graphic films comprising:

a head portion, said head portion including an elongated member, said elongated member being constructed from a substantially rigid material to include a blade portion and a strengthening rib portion, said blade portion and said strengthening rib portion extending between distal ends of said elongated member to define a working length thereof, a handle portion, said handle portion including a grip portion and a securing portion, said securing portion constructed and arranged for securement to said elongated member, and a pad secured to the outer surface of said blade portion to extend around the working edge of the blade, said pad constructed from a material that includes fibers extending outwardly from a base surface of said pad, said fibers being suitably resilient to allow said pad to cooperate with surfaces having small imperfections or curves to provide contact with a substantial length of said working length of said head portion without marring the visible surface of said graphic film material.

2. The hand operable tool of claim 1 wherein said pad is constructed and arranged to provide sufficient force to said graphic film material to break microcapsules containing adhesive on a back side of said graphic film material.

3. The hand operable tool of claim 1 wherein said pad is constructed to include a backing portion secured to said blade portion, said backing portion including a plurality of polymeric loops secured thereto, each of said polymeric loops having a predetermined thickness to provide a predetermined force to said visible surface of said graphic film material.

4. The hand operable tool of claim 3 wherein said backing portion is secured to said blade portion of said elongated member by adhesive thereby facilitating removal and replacement of said pad.

5. The hand operable tool of claim 1 wherein said blade portion has a thickness from about 1⁄16 of an inch to about 3⁄8 of an inch.

6. The hand operable tool of claim 5 wherein said blade portion has a thickness of about 3⁄16 of an inch.

7. The hand operable tool of claim 5 wherein said blade portion has a width of about 2 inches.

8. The hand operable tool of claim 5 wherein said working length is between about 3 inches and about 48 inches.

9. The hand operable tool of claim 1 wherein said strengthening rib is formed with a consistent thickness and height across the range of blade thicknesses to minimize manufacturing tooling changes while providing consistency for attachment of said handle portion.

10. The hand operable tool of claim 9 wherein said strengthening rib is formed to be about ½ inch thick and about 1 inch in height.

11. The hand operable tool of claim 9 including a transitional shape extending between said strengthening rib and said blade portion to add rigidity to said head portion.

12. The hand operable tool of claim 11 wherein said transitional shape is a fillet.

13. The hand operable tool of claim 9 wherein said blade includes a uniform cross section extending along the length thereof which facilitates formation of said blade portion by the process of extrusion.

14. The hand operable tool of claim 13 wherein a working edge of said blade portion includes a radius which extends across the width of the blade.

15. The hand operable tool of claim 1 wherein said securing portion includes a U-shaped opening sized to slip over said strengthening rib for weldment thereto.

16. The hand operable tool of claim 1 wherein said securing portion includes a U-shaped opening sized to slip over said strengthening rib, at least one leg of said U-shaped opening including a set screw for removable securement to said strengthening rib.

17. The hand operable tool of claim 1 wherein said securing portion includes a V-shaped opening sized to allow said handle to be secured to said strengthening rib at a desired angle for weldment thereto.

18. The hand operable tool of claim 1 wherein said hand operable tool is supplied in a kit, said kit including a plurality of said head portions each having a different length, at least one handle portion, said at least one handle portion including a grip portion and a securing portion, said handle portion constructed and arranged for removable securement to any one of said plurality of said head portions, and a plurality of pads, said pads provided to include lengths corresponding to the lengths of said head portions, said pads provided to include loops of different thickness, whereby said pads may be interchanged to provide different surface forces to said graphic film material.

* * * * *